Jan. 9, 1962 W. KADEN 3,015,999
PROTECTIVE DEVICE FOR PHOTOGRAPHIC EQUIPMENT
Filed March 11, 1958
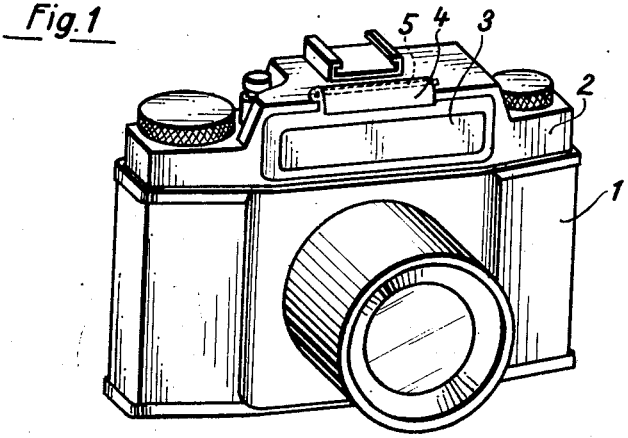
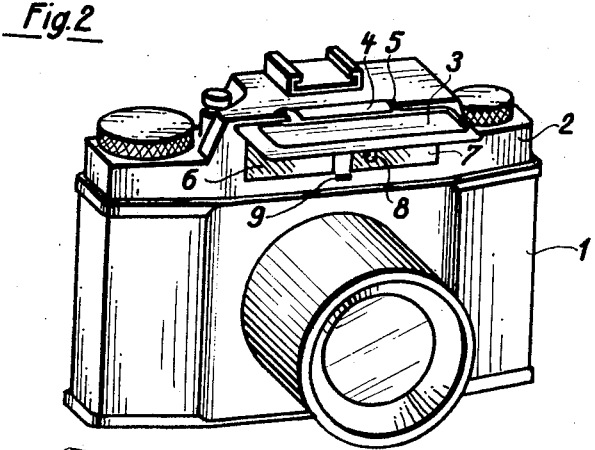
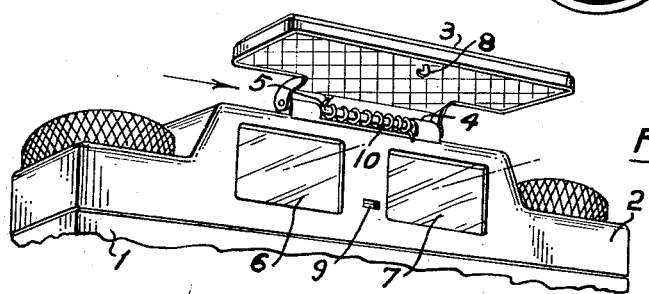
INVENTOR.
Willy KADEN
BY Michael S. Striker
Attorney United States Patent Office 3,015,999
Patented Jan. 9, 1962

1

3,015,999
PROTECTIVE DEVICE FOR PHOTOGRAPHIC EQUIPMENT
Willy Kaden, Munich, Germany, assignor to Agfa Aktiengesellschaft, Leverkusen-Bayerwerk, Germany, a corporation of Germany
Filed Mar. 11, 1958, Ser. No. 720,664
Claims priority, application Germany Mar. 20, 1957
2 Claims. (Cl. 95—11)

The present invention relates to photographic devices such as cameras.

Conventional cameras have windows which are exposed at all times. Such windows form the entrance for light to the view finder and range finder of the camera, and also such a window may be in the form of a photocell of an exposure meter carried by the camera. Windows of this type, because they are exposed, may be struck by blows, are freely accessible to moisture, dust, fingerprints, and the like. They are also freely accessible to objects which undesirably press against such windows.

One of the objects of the present invention is to provide a photographic device with a structure which will protect windows of the above type against undesirable influences such as dust, dampness, blows, pressure, fingerprints, and the like.

Another object of the present invention is to provide a device capable of protecting such a window and at the same time being of an exceedingly simple construction.

An additional object of the present invention is to provide a protective device of this type which is easily movable between a closed position covering the window which is to be protected and an open position uncovering the window.

It is also an object of the present invention to provide a protective device of this type which is also capable of acting as a light shade.

With the above objects in view the present invention includes in a camera or the like a window through which light passes and a cover for protecting such a window, this cover being mounted for movement between a closed position covering the window and an open position uncovering the window.

The novel features which are considered as characteristic for the invention are set forth in particular in the appended claims. The invention itself, however, both as to its construction and its method of operation, together with additional objects and advantage thereof, will be best understood from the following description of specific embodiments when read in connection with the accompanying drawings, in which:

FIG. 1 shows in a schematic perspective view a camera provided with a protective cover according to the present invention, this cover being shown in a closed position in FIG. 1;

FIG. 2 shows the cover of FIG. 1 in an open position; and

FIG. 3 is a partial perspective view similar to FIG. 2.

Referring to FIG. 1, it will be seen that a camera is shown therein having a camera housing 1 and an upper camera assembly 2. This upper assembly carries the elongated protective cover 3 which in the position shown in FIG. 1 covers the windows of the view and range finder mechanism of the camera. The cover 3 has an extention 4 part of which extends around a pivot pin 5 fixed to the upper camera part 2 and extending longitudinally of the camera. Thus, the cover 3 is turnable from its closed position shown in FIG. 1 upwardly to its open position shown in FIGS. 2 and 3 where the windows 6 and 7 of the range and view finder assembly are uncovered. A pin fixed to the portion 4 of the cover 3 engages an exterior surface of part 2 of the camera to limit the

2 cover 3 to movement up to the position shown in FIG. 2, so that the cover 3 simultaneously serves as a sunshade for preventing glare.

As is shown in FIGS. 2 and 3 the cover 3 fixedly carries a projection 8 which extends into an opening 9 of the camera part 2 when the cover 3 is in its closed position. A spring 10 is coiled about the pivot pin 5, has one end connected with the portion 4 of the cover 3, and has its other end connected with the camera part 2, and this spring 10 urges the cover 3 upwardly to the open position thereof shown in FIG. 2. Furthermore, when the projection 8 is in the opening 9, this spring 10 urges the cover 3 longitudinally of the pivot pin 5 to press the projection 8 against an end of the opening 9 for releasably holding the cover in its closed position. In order to open the cover it is only necessary for the operator to shift the cover along the pivot pin 5 against the force of the spring 10 through a slight distance so that the spring 10 is in this way free to turn the cover 3 to its open position. Of course, the opening 9 is slightly wider than the projection 8.

This cover 3 of the present invention can be used for covering windows other than those of a view finder and a range finder. For example, where the camera has openings for providing image-framing marks in the view finder image, the cover 3 may also cover such openings, and where the camera is provided with an exposure meter, the cover 3 may cover the photocell of the exposure meter when the latter is not used.

It will be understood that each of the elements described above, or two or more together, may also find a useful application in other types of photographic devices differing from the types described above.

While the invention has been illustrated and described as embodied in a protective device for photographic equipment, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a camera, in combination, a camera front wall member formed with a plurality of windows through which light passes, said front wall member also being formed with an aperture located below said windows; an elongated pivot pin carried by said front wall member over and extending along said windows; a cover member turnably carried by said pivot pin for turning movement between a closed position substantially parallel to said front wall member and covering said windows and an open position substantially perpendicular to said front wall member and uncovering said windows while at the same time forming a light shade therefor, said cover member having adjacent an edge thereof which is distant from said pivot pin a projection which extends into said aperture when said cover member is in said closed position thereof; and spring means carried by said pivot pin and cooperating with said cover member for urging the latter to turn around said pivot pin from said closed to said open position and also urging said cover member longitudinally along said pivot pin so that when said cover member is in said closed position thereof said projection will be urged by said spring means against an edge of said front wall member at said aperture to releasably maintain said cover member in said closed position thereof, whereby when said cover member is manually moved longitudinally along said pin in opposition to said spring means said projection will be moved out of engagement with said front wall member so that said spring means can turn said cover member to said open position thereof.

2. In a camera as recited in claim 1, a stop carried by one of said members and engaging the other of said members when said cover member is in said open position thereof to limit said cover to angular turning movement of substantially 90° between said positions and to hold said cover in said open position perpendicular to said front wall member.

References Cited in the file of this patent

UNITED STATES PATENTS

| | | |
|---|---|---|
| 1,623,534 | Duhamel | Apr. 5, 1927 |
| 1,775,180 | Worsching | Sept. 9, 1930 |
| 2,356,880 | Pignone | Aug. 29, 1944 |
| 2,466,786 | Throne | Apr. 12, 1949 |
| 2,714,844 | Heidecke | Aug. 9, 1955 |
| 2,866,396 | Collins | Dec. 30, 1958 |

FOREIGN PATENTS

| | | |
|---|---|---|
| 807,862 | Germany | July 5, 1951 |